United States Patent
Tai et al.

(10) Patent No.: US 8,546,764 B1
(45) Date of Patent: Oct. 1, 2013

(54) ACTIVE X-RAY SENSING CIRCUIT AND THE SENSING METHOD THEREOF

(75) Inventors: Ya-Hsiang Tai, Hsinchu (TW);
Lu-Sheng Chou, Kaohsiung (TW);
Bo-Cheng Chen, Keelung (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 13/596,423

(22) Filed: Aug. 28, 2012

(30) Foreign Application Priority Data

May 14, 2012 (TW) .............................. 101117029 A

(51) Int. Cl.
*G01T 1/24* (2006.01)
(52) U.S. Cl.
USPC .................................................... 250/370.09
(58) Field of Classification Search
USPC ........................................ 250/370.01, 370.09
See application file for complete search history.

(56) References Cited

U.S. PATENT DOCUMENTS

| 2002/0093581 A1* | 7/2002 | Ikeda et al. | 348/302 |
| 2006/0113484 A1* | 6/2006 | Endo | 250/370.11 |
| 2006/0237647 A1* | 10/2006 | Ikeda et al. | 250/330 |

* cited by examiner

*Primary Examiner* — Mark R Gaworecki
(74) *Attorney, Agent, or Firm* — Bacon & Thomas, PLLC

(57) ABSTRACT

The present invention provides an active X-ray sensing circuit and the sensing method thereof, it is applied in X-ray panel. The X-ray sensing circuit comprises two row of pixel circuit, and the two row of pixel circuit shares one scan line, and each data line connects with two switches. It is compensated the threshold voltage when it switches to the current source. It operates reading when it switches to amplifier. By applying specific scan line signal, the last-row pixel circuit is compensated and the next-row pixel row is read at the same time, so that the sensing circuit array can compensate and sense in one scan to avoid the effect of the leakage current.

14 Claims, 2 Drawing Sheets

ACTIVE X-RAY SENSING CIRCUIT AND THE SENSING METHOD THEREOF

BACKGROUND OF THE INVENTION

1. Field of the Invention

The present invention relates to an active X-ray sensing circuit and the sensing method thereof, more particularly to an active X-ray sensing circuit compensates and senses in one scan and the sensing method thereof.

2. Description of the Prior Art

The conventional X-ray sensing circuit and the X-ray sensing method are used for dealing with the threshold voltage compensation, lighting and reading etc. The compensation circuit and the reading circuit cannot be used at the same time. Thus, the compensation circuit and the reading circuit need independent circuit, therefore the above-mentioned circuit design becomes more complicated and huge.

At present, most active X-ray sensing circuit array (APS) focuses on the change of the sensing circuit. The circuit with threshold voltage compensation is scarcely available. Thus, it is unable to compensate the effect of device by the change of the threshold voltage.

In addition, the conventional technique is unable to compensate the threshold voltage and read the current at the same time. It will take longer time, and the leakage current of transistor will reduce the sensing accuracy.

In view of the above-mentioned consideration, in order to satisfy the long-term need of industry, it is necessary to provide an active X-ray sensing circuit and the X-ray sensing method. In the method, one-row pixel circuit compensates the threshold voltage and the next-row pixel circuit reads at the same time, so that the sensing circuit array can compensate and sense the threshold voltage in one scan to avoid the effect of the sensing accuracy and increase the sensing accuracy.

SUMMARY OF THE INVENTION

One purpose of the present invention is to provide an active X-ray sensing circuit and the sensing method thereof, it is applied to X-ray panel. The X-ray sensing circuit comprises two row of pixel circuit, and the two row of pixel circuit shares one scan line, and each data line connects with two switches. It is compensated the threshold voltage when it switches to the current source. It operates reading when it switches to amplifier. By applying specific scan line signal, the last-row pixel circuit is compensated and the next-row pixel row is read at the same time, so that the sensing circuit array can compensate and sense in one scan to avoid the effect of the leakage current.

One purpose of the present invention is to provide an active X-ray sensing circuit for compensating and sensing the threshold voltage of transistor in one scan. The active X-ray sensing circuit comprises a first-row pixel circuit, a second-row pixel circuit, a first data line, a second data line, a third data line and a fourth data line. The first-row pixel circuit comprises a first pixel circuit and a second pixel circuit, wherein, the first pixel circuit and the second pixel circuit are connected between the first scan line and the second scan line. The second-row pixel circuit comprises a third pixel circuit and a fourth pixel circuit, wherein, the third pixel circuit and the fourth pixel circuit are connected between the second scan line and the third scan line.

The first data line is connected to the first current source and the first amplifier. The second data line is connected to the second current source and the second amplifier. Wherein, the first pixel circuit and the third pixel circuit are connected between the first data line and the second data line. The third data line is connected to the second current source and the second amplifier. The fourth data line is connected to the third current source and the third amplifier. The second pixel circuit and the fourth pixel circuit are connected between the third data line and the fourth data line. Wherein, the first-row pixel circuit conducts the reading first. When the reading is completed by the first-row pixel circuit, the second-row pixel circuit conducts the reading. Meantime, the first pixel circuit and the second pixel circuit of the first-row pixel circuit compensate the threshold voltage, separately.

Another purpose of the present invention is to provide an X-ray sensing method for compensating and sensing the threshold voltage of transistor in one scan. The steps of the active X-ray sensing method comprises providing a first-row pixel circuit, which comprises a first pixel circuit and a second pixel circuit, wherein, the first pixel circuit and the second pixel circuit are connected between the first scan line and the second scan line. Providing a second-row pixel circuit, the second-row pixel circuit comprises the third pixel circuit and the fourth pixel circuit. Wherein, the third pixel circuit and the fourth pixel circuit are connected between the second scan line and the third scan line. Providing the first data line, the first data line is connected to the first current source and the first amplifier. Providing the second data line, the second data line is connected to the second current source and the second amplifier. Wherein, the first pixel circuit and the third pixel circuit are connected between the first data line and the second data line.

Then, providing the third data line, which is connected to the second current source and the second current source, providing the fourth data line, which is connected to the third current source and the third amplifier, wherein, the second pixel circuit and the fourth pixel circuit are connected between the second data line and the third data line. Wherein, the first-row pixel circuit, the second-row pixel circuit, the first data line, the second data line, the third data line and the fourth data line are set in the active X-ray sensing circuit. The first-row pixel circuit conducts the reading first. When the reading is completed by the first-row pixel circuit, the second-row pixel circuit conducts the reading. Meantime, the first pixel circuit and the second pixel circuit of the first-row pixel circuit compensate the threshold voltage separately.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
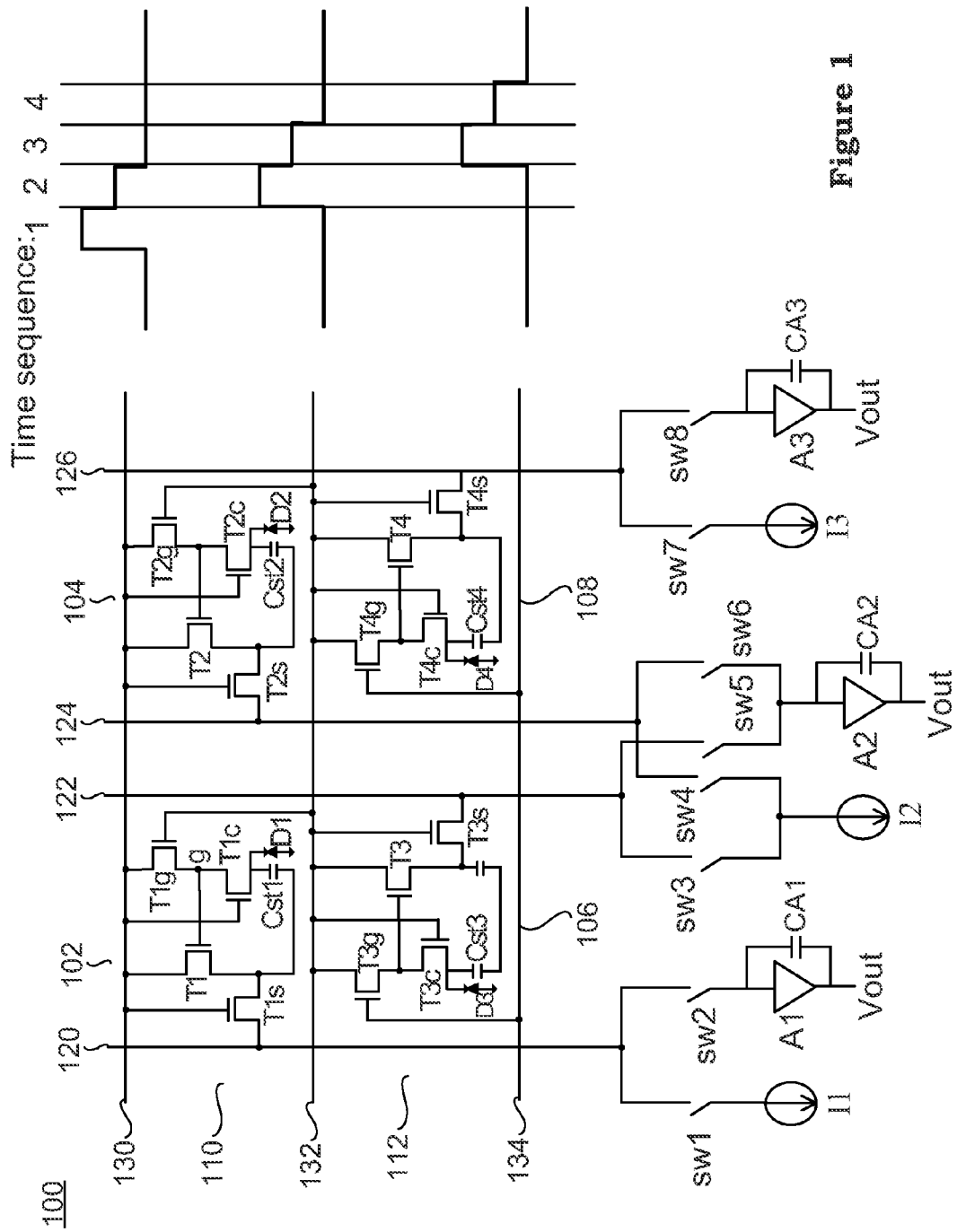
FIG. 1 is a diagram illustrating an embodiment for the active X-ray sensing circuit of the present invention.

The preferred embodiments and the efficacy are described with the attached Figures as follows. Please referring to FIG. 1, which is a diagram illustrating an embodiment for the active X-ray sensing circuit of the present invention. The active X-ray sensing circuit 100 provided by the present invention comprises a first-row pixel circuit 110, a second-row pixel circuit 112, a first data line 120, a second data line 122, a third data line 124 and a fourth data line 126. The first-row pixel circuit 110 comprises a first pixel circuit 102 and a second pixel circuit 104. The first pixel circuit 102 and the second pixel circuit 104 are connected between the first scan line 130 and the second scan line 132. The second-row pixel circuit 112 comprises a third pixel circuit 106 and a fourth pixel circuit 108. Wherein, the third pixel circuit 106 and the fourth pixel circuit 108 are connected between the second scan line 132 and the third scan line 134.

In this embodiment, the first data line 120 is connected to the first current source I1 and the first amplifier A1. The second data line 122 is connected to the second current source I2 and the second amplifier A2. Wherein, the first pixel circuit 102 and the third pixel circuit 106 are connected between the first data line 120 and the second data line 122. The third data line 124 is connected to the second current source I2 and the second amplifier A2. The fourth data line 126 is connected to the third current source I3 and the third amplifier A3. Wherein, the second pixel circuit 104 and the fourth pixel circuit 108 are connected between the third data line 124 and the fourth data line 126. The first-row pixel circuit 110 conducts the reading firstly. When the reading is completed by the first-row pixel circuit 110, the second-row pixel circuit 112 conducts the reading. Meantime, the first pixel circuit 102 and the second pixel circuit 104 of the first-row pixel circuit 110 compensate the threshold voltage, separately.

As shown in FIG. 1, the first pixel circuit 102 comprises a first transistor T1, a first gate transistor T1g, a first source transistor T1s, a first capacitance transistor T1c, a first capacitor Cst1 and a first diode D1. The first end of the first transistor T1 is connected to the first scan line 130. The third end of the first gate transistor T1g is connected to the second end of the first transistor T1. The first end of the first gate transistor T1g is connected to the first scan line 130. The second end of the first gate transistor T1g is connected to the second scan line 132. The first end of the first source transistor T1s is connected to the first data line 120. The second end of the first source transistor T1s is connected to the first scan line 130. The third end of the first source transistor T1s is connected to the third end of the first transistor T1. The first end of the first capacitance transistor T1c is connected to the third end of the first gate transistor T1g. The second end of the first capacitance transistor T1c is connected to the first scan line 130. One end of the first capacitor is connected to the third end of the first capacitance transistor T1c. Another end of the first capacitor Cst1 is connected to the third end of the first transistor T1. The first diode D1 is connected to the third end of the first capacitance transistor T1c.

As shown in FIG. 1, the second pixel circuit 104 comprises a second transistor T2, a second gate transistor T2g, a second source transistor T2s, a second capacitance transistor T2c, a second capacitor Cst2 and a second diode D2. The first end of the second transistor T2 is connected to the first scan line 130. The third end of the second gate transistor T1g is connected to the second end of the second transistor T2. The first end of the second gate transistor T2g is connected to the first scan line 130. The second end of the second gate transistor T2g is connected to the second scan line 132. The first end of the second source transistor T2g is connected to the third data line 124. The second end of the second source transistor T2s is connected to the first scan line 130. The third end of the second source transistor T2s is connected to the third end of the second transistor T2. The first end of the second capacitance transistor T2c is connected to the third end of the second gate transistor T2g. The second end of the second capacitance transistor T2c is connected to the first scan line 130. One end of the second capacitor is connected to the third end of the second capacitance transistor T2c. Another end of the second capacitor Cst2 is connected to the third end of the second transistor T2. The second diode D2 is connected to the third end of the second capacitance transistor T2c.

As shown in FIG. 1, the third pixel circuit 106 includes a third transistor T3, a third gate transistor T3g, a third source transistor T3s, a third capacitance transistor T3c, a third capacitor Cst3 and a third diode D3. The first end of the third transistor T3 is connected to the second scan line 132.

As shown in FIG. 1, the third end of the third gate transistor T3g is connected to the second end of the third transistor T3. The first end of the third gate transistor T3g is connected to the second scan line 132. The second end of the third gate transistor T3g is connected to the third scan line 134. The first end of the third source transistor T3s is connected to the second data line 132. The second end of the third source transistor T3s is connected to the second scan line 132. The third end of the third source transistor T3s is connected to the third end of the third transistor T3. The first end of the third capacitance transistor T3c is connected to the third end of the third gate transistor T3g. The second end of the third capacitance transistor T3c is connected to the second scan line 132. One end of the third capacitor Cst3 is connected to the third end of the third capacitance transistor T3c. Another end of the third capacitor Cst3 is connected to the third end of the third transistor. The third diode is connected to the third end of the third capacitance transistor T3c.

As shown in FIG. 1, the fourth pixel circuit 108 comprises a fourth transistor T4, a fourth gate transistor T4g, a fourth source transistor T4s, a fourth capacitance transistor T4c, a fourth capacitor Cst4 and a fourth diode D4. The first end of the fourth transistor T4 is connected to the second scan line 132. The third end of the fourth gate transistor T4 is connected to the second end of the fourth transistor T4. The first end of the fourth gate transistor T4g is connected to the second scan line 132. The second end of the fourth gate transistor T4g is connected to the third scan line 134. The first end of the fourth source transistor T4s is connected to the fourth data line 126. The second end of the fourth source transistor T4s is connected to the second scan line 132. The third end of the fourth source transistor T4s is connected to the third end of the fourth transistor T4. The first end of the fourth capacitance transistor T4c is connected to the third end of the fourth gate transistor T4g. The second end of the fourth capacitance transistor T4c is connected to the third scan line 134. One end of the fourth capacitor is connected to the third end of the fourth capacitance transistor T4c. Another end of the fourth capacitor Cst4 is connected to the third end of the fourth transistor T4. The fourth diode D4 is connected to the third end of the fourth capacitance transistor T4c.

As shown in FIG. 1, the active X-ray sensing circuit 100 comprises a first current source I1, a first amplifier A1, a first amplifying capacitor CA1, a first switch SW1 and a second switch SW2. The first switch SW1 is connected between the first data line 120 and the first current source I1. The second switch SW2 is connected between the first data line 120 and the first amplifier A1. The first amplifier A1 is connected to the first amplifying capacitor CA1.

As shown in FIG. 1, the active X-ray sensing circuit 100 comprises a second current source I2, a second amplifier A2, a second amplifying capacitor CA2, a third switch SW3 and a fifth switch SW5. The third switch SW3 is connected between the second data line 122 and the second current source I2. The fifth switch SW5 is connected between the second data line 122 and the second amplifier A2. The second amplifier A2 is connected to the second amplifying capacitor CA2.

As shown in FIG. 1, the active X-ray sensing circuit 100 comprises a fourth switch SW4 and a sixth switch SW6. The fourth switch SW4 is connected between the third data line 124 and the second current source I2. The sixth switch SW6 is connected between the third data line 124 and the second amplifier A2. The second amplifier A2 is connected to the second amplifying capacitor CA2.

As shown in FIG. 1, the active X-ray sensing circuit 100 comprises a seventh switch SW7 and an eighth switch SW8. The seventh switch SW7 is connected between the fourth data line 126 and the third current source I3. The eighth switch SW8 is connected between the fourth data line 126 and the third amplifier A3. The third amplifier A3 is connected to the third amplifying capacitor CA3.

As shown in FIG. 1, after the active X-ray sensing circuit 100 is radiated by the X-ray, the scan line starts to provide the waveform of voltage. At time sequence 1, the second switch SW2 and the sixth switch SW6 are turned off to control the first-row pixel circuit 110 for reading. The first voltage is changed because the first capacitor Cst1 is radiated by the first X-ray, so that the first transistor T1 outputs a corresponding first sensing current (not shown in the Figure). The second voltage is changed because the second capacitor Cst2 is radiated by the second X-ray, so that the second transistor T2 outputs a corresponding second sensing current (not shown in the Figure).

As shown in FIG. 1, at time sequence 2, the second switch SW2 and the sixth switch SW6 are turned on, and the first switch SW1 and the fourth switch SW4 are turned off. The first-row pixel circuit 110 starts to conduct the compensation action. The first current flowing through the first transistor T1 equals to the current value of the first current source I1. The first current source I1 makes a first threshold voltage Vth1 of the first transistor T1 to be stored in the first capacitor Cst1, so that the first transistor Cst1 conducts the compensation action. The second current flowing through the second transistor T2 equals to the current value of the second current source I2. The second current source I2 makes a second threshold voltage Vth2 of the second transistor T2 to be stored in the second capacitor Cst2, so that the second transistor Cst2 conducts the compensation action. The fifth switch SW5 and the eighth switch SW8 are turned off. The second-row pixel circuit 112 conducts the compensation action. The third voltage is changed because the third capacitor Cst3 is radiated by the third X-ray, so that the third transistor T3 outputs a corresponding third sensing current (not shown in the Figure). The fourth voltage is changed because the fourth capacitor Cst4 is radiated by the fourth X-ray, so that the fourth transistor T4 outputs a corresponding fourth sensing current (not shown in the Figure).

As shown in FIG. 1, at time sequence 3, the first switch SW1 and the fourth switch SW4 are turned on. The compensation action of the first-row pixel circuit 110 is finished. The third switch SW3 and the seventh switch SW7 are turned off. The second-row pixel circuit 112 starts to conduct the compensation action. The third current flowing through the third transistor T3 equals to the current value of the second current source I2. The second current source I2 makes a third threshold voltage Vth3 of the third transistor T3 to be stored in the third capacitor Cst3, so that the third transistor Cst3 conducts the compensation action. The fourth current flowing through the fourth transistor T4 equals to the current value of the third current source I3. The third current source I3 makes a fourth threshold voltage Vth4 of the fourth transistor T4 to be stored in the fourth capacitor Cst4, so that the fourth transistor Cst4 conducts the compensation action.

As shown in FIG. 1, at time sequence 4, the third switch SW3 and the seventh switch SW7 are turned on. The compensation action of the second-row pixel circuit 112 is finished.

Figure 2:
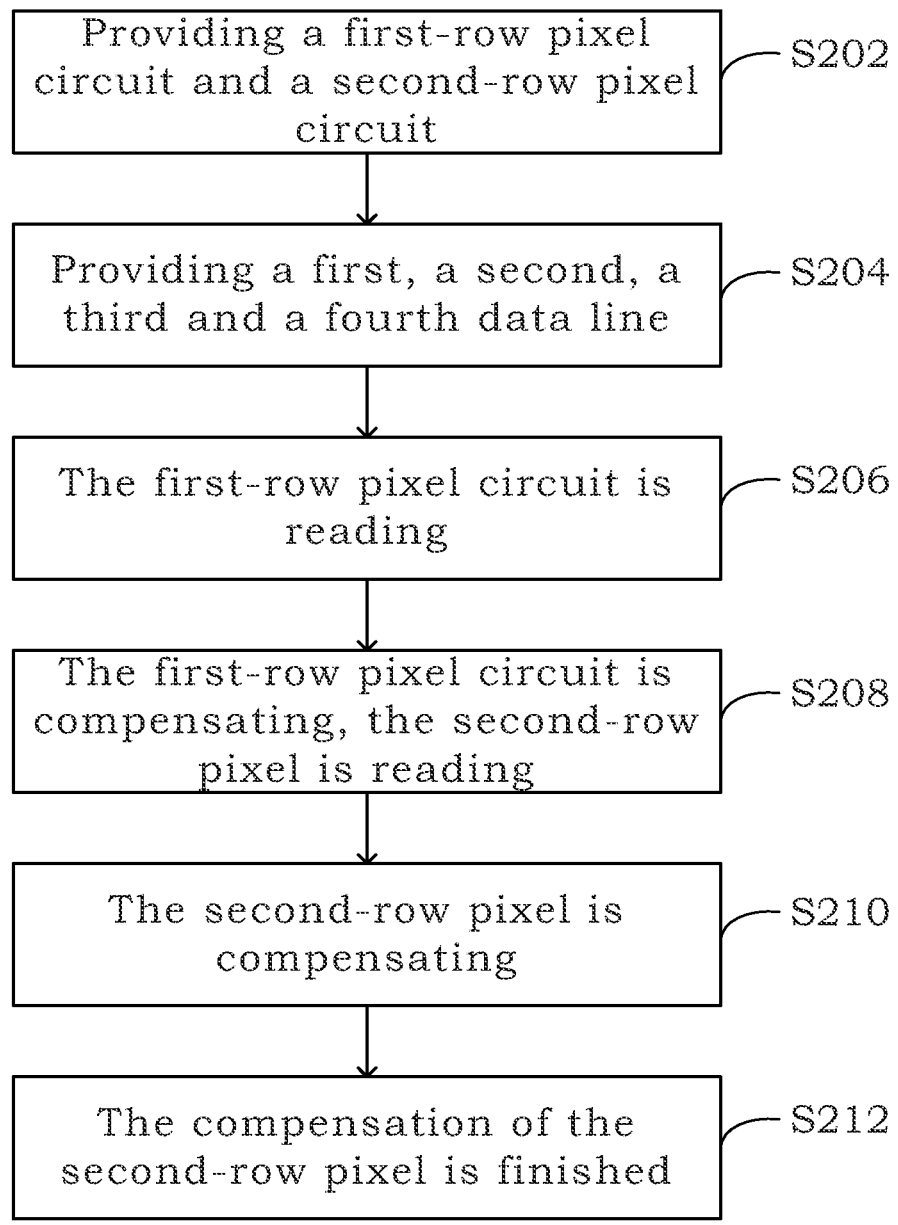
FIG. 2 is a diagram illustrating the flow chart of the active X-ray sensing circuit.

Please referring to FIG. 2, which is a diagram illustrating the flow chart of the active X-ray sensing circuit. Please referring to FIG. 1 and FIG. 2, the X-ray sensing method is to provide an active X-ray sensing circuit for compensating and sensing the threshold voltage of transistor in one scan.

As shown in Step S202, a first-row pixel circuit 110 and a second-row pixel circuit 112 are provided.

As shown in Step S204, a first data line 120, a second data line 122, a third data line 124 and a fourth data line 126 are provided. The first-row pixel circuit comprises a first pixel circuit 102 and a second pixel circuit 104. The first pixel circuit 102 and the second pixel circuit 104 are connected between the first scan line 130 and the second scan line 132. The second-row pixel circuit 112 comprises a third pixel circuit 106 and a fourth pixel circuit 108. Wherein, the third pixel circuit 106 and the fourth pixel circuit 108 are connected between the second scan line 132 and the third scan line 134.

As shown in Step S206, after the active X-ray sensing circuit 100 is radiated by the X-ray, the scan line starts to provide the waveform of voltage. At time sequence 1, the second switch SW2 and the sixth switch SW6 are turned off to control the first-row pixel circuit 110 for reading. The first voltage is changed because the first capacitor Cst1 is radiated by the first X-ray, so that the first transistor T1 outputs a corresponding first sensing current (not shown in the Figure). The second voltage is changed because the second capacitor Cst2 is radiated by the second X-ray, so that the second transistor T2 outputs a corresponding second sensing current (not shown in the Figure).

As shown in Step S208, at time sequence 2, the second switch SW2 and the sixth switch SW6 are turned on, and the first switch SW1 and the fourth switch SW4 are turned off. The first-row pixel circuit 110 starts to conduct the compensation action. The first current flowing through the first transistor T1 equals to the current value of the first current source I1. The first current source I1 makes a first threshold voltage Vth1 of the first transistor T1 to be stored in the first capacitor Cst1, so that the first transistor Cst1 conducts the compensation action. The second current flowing through the second transistor T2 equals to the current value of the second current source I2. The second current source I2 makes a second threshold voltage Vth2 of the second transistor T2 to be stored in the second capacitor Cst2, so that the second transistor Cst2 conducts the compensation action. The fifth switch SW5 and the eighth switch SW8 are turned off. The second-row pixel circuit 112 conducts the compensation action. The third voltage is changed because the third capacitor Cst3 is radiated by the third X-ray, so that the third transistor T3 outputs a corresponding third sensing current (not shown in the Figure). The fourth voltage is changed because the fourth capacitor Cst4 is radiated by the fourth X-ray, so that the fourth transistor T4 outputs a corresponding fourth sensing current (not shown in the Figure).

As shown in Step S210, at time sequence 3, the first switch SW1 and the fourth switch SW4 are turned on. The compensation action of the first-row pixel circuit 110 is finished. The third switch SW3 and the seventh switch SW7 are turned off. The second-row pixel circuit 112 starts to conduct the compensation action. The third current flowing through the third transistor T3 equals to the current value of the second current source I2. The second current source I2 makes a third threshold voltage Vth3 of the third transistor T3 to be stored in the third capacitor Cst3, so that the third transistor Cst3 conducts the compensation action. The fourth current flowing through the fourth transistor T4 equals to the current value of the third current source I3. The third current source I3 makes a fourth threshold voltage Vth4 of the fourth transistor T4 to be stored in the fourth capacitor Cst4, so that the fourth transistor Cst4 conducts the compensation action.

As shown in Step S212, at time sequence 4, the third switch SW3 and the seventh switch SW7 are turned on. The compensation action of the second-row pixel circuit 112 is finished. Therefore, all steps are finished.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active X-ray sensing circuit for compensating and sensing the threshold voltage of transistor in one scan, the active X-ray sensing circuit comprises:
    a first-row pixel circuit, including a first pixel circuit and a second pixel circuit, wherein the first pixel circuit and the second pixel circuit being connected between a first scan line and a second scan line;
    a second-row pixel circuit, including a third pixel circuit and a fourth pixel circuit, wherein the third pixel circuit and the fourth pixel circuit being connected between a second scan line and a third scan line;
    a first data line, the first data line being connected to a first current source and a first amplifier;
    a second data line, the second data line being connected to a second current source and a second amplifier, the first pixel circuit and the third pixel circuit being connected between the first data line and the second data line;
    a third data line, the third data line being connected to a second current source and a second amplifier; and
    a fourth data line, the forth data line being connected to a third current source and a third amplifier, wherein, the second pixel circuit and the fourth pixel circuit being connected between the third data line and the fourth data line;
    wherein, the first-row pixel circuit conducting a reading, when the reading being completed by the first-row pixel circuit, the second-row pixel circuit conducting another reading, the first pixel circuit and the second pixel circuit of the first-row pixel circuit compensating a threshold voltage separately.

2. The circuit according to claim 1, wherein the first pixel circuit comprises:
    a first transistor, a first end of the first transistor being connected to a first scan line;
    a first gate transistor, a third end of the first gate transistor being connected to a second end of the first transistor, a first end of the first gate transistor being connected to a first scan line, a second end of the first gate transistor being connected to a second scan line;
    a first source transistor, a first end of the first source transistor being connected to a first data line, a second end of the first source transistor being connected to the first scan line, a third end of the first source transistor being connected to the source of the first transistor;
    a first capacitance transistor, a first end of the first capacitance transistor being connected to the third end of the first gate transistor, the second end of the first capacitance transistor being connected to the first scan line;
    a first capacitor, one end being connected to a third end of the first capacitance transistor, another end of the first capacitor being connected to a third end of the first transistor; and
    a first diode, the first diode being connected to the third end of the first capacitance transistor;
    a second pixel circuit comprising:
        a second transistor, a first end of the second transistor being connected to the first scan line;
        a second gate transistor, a third end of the second gate transistor being connected to a second end of the second transistor, the first end of the second gate transistor being connected to the first scan line, the second end of the second gate transistor being connected to the second scan line;
        a second source transistor, a first end of the second source transistor being connected to the third data line, a second end of the second source transistor being connected to the first scan line, a third end of the second source transistor being connected to a third end of the second transistor;
        a second capacitance transistor, a first end of the second capacitance transistor being connected to a third end of the second gate transistor, a second end of the second capacitance transistor being connected to the first scan line;
        a second capacitor, one end being connected to a third end of the second capacitance transistor, another end of the second capacitor being connected to a third end of the second transistor; and
        a second diode, the second diode being connected to a third end of the second capacitance transistor;
    a third pixel circuit comprising:
        a third transistor, a first end of the third transistor being connected to the second scan line;
        a third gate transistor, a third end of the third gate transistor being connected to a second end of the third transistor, a first end of the third gate transistor being connected to the second scan line, the second end of the third gate transistor being connected to the third scan line;
        a third source transistor, a first end of the third source transistor being connected to the second data line, a second end of the third source transistor being connected to the second scan line, a third end of the third source transistor being connected to a third end of the third transistor;
        a third capacitance transistor, a first end of the third capacitance transistor being connected to a third end of the third gate transistor, a second end of the third capacitance transistor being connected to the second scan line;
        a third capacitor, one end of the third capacitor being connected to a third end of the third capacitance transistor, another end of the third capacitor being connected to the third end of the third transistor; and
        a third diode, the third diode being connected to the third end of the third capacitance transistor; and
    a fourth pixel circuit comprising:
        a fourth transistor, a first end of the fourth transistor being connected to the second scan line;
        a fourth gate transistor, a third end of the fourth gate transistor being connected to a second end of the fourth transistor, a first end of the fourth gate transistor being connected to the second scan line, the second end of the fourth gate transistor being connected to the third scan line;

a fourth source transistor, a first end of the fourth source transistor being connected to the fourth data line, a second end of the fourth source transistor being connected to the second scan line, a third end of the fourth source transistor being connected to a third end of the fourth transistor;

a fourth capacitance transistor, a first end of the fourth capacitance transistor being connected to a third end of the fourth gate transistor, a second end of the fourth capacitance transistor being connected to the third scan line;

a fourth capacitor, one end of the fourth capacitor being connected to the third end of the fourth capacitance transistor, another end of the fourth capacitor being connected to the third end of the fourth transistor; and a fourth diode, the fourth diode being connected to the third end of the fourth capacitance transistor.

3. The circuit according to claim 2, further comprises a first current source a first amplifier a first amplifying capacitor a first switch and a second switch, a second current source, a second amplifier, a second amplifying capacitor, a third switch, a fourth switch, a fifth switch, a sixth switch, a seventh switch and an eighth switch, the first switch being connected between a first data line and a first current source, the second switch being connected between the first data line and the first amplifier, the first amplifier being connected to the first amplifying capacitor, the third switch is connected between the second data line and the second current source, the fifth switch being connected between the second data line and the second amplifier, the second amplifier being connected to the second amplifying capacitor, the fourth switch being connected between the third data line and the second current source, the sixth switch being connected between the third data line and the second amplifier, the second amplifier being connected to the second amplifying capacitor, the seventh switch being connected between the fourth data line and the third current source, the eighth switch being connected between the fourth data line and the third amplifier, the third amplifier being connected to the third amplifying capacitor.

4. The circuit according to claim 3, wherein the second switch and the sixth switch being turned off to control a first-row pixel circuit for reading, the first voltage being changed because the first capacitor being radiated by a first X-ray, so that a first transistor outputting a corresponding first sensing current, a second voltage being changed because the second capacitor being radiated by a second X-ray, so that the second transistor outputting a corresponding second sensing current.

5. The circuit according to claim 4, wherein the second switch and the sixth switch being turned on, and the first switch and the fourth switch being turned off, the first-row pixel circuit starting to conduct a compensation action, a first current flowing through the first transistor equaling to a current value of the first current source, the first current source making a first threshold voltage of the first transistor to be stored in the first capacitor, so that the first transistor conducting the compensation action, the second current flowing through the second transistor equaling to a current value of the second current source, the second current source making a second threshold voltage of the second transistor to be stored in the second capacitor, so that the second transistor conducting the compensation action, the fifth switch and the eighth switch being turned off, the second-row pixel circuit conducting the compensation action, the third voltage being changed because the third capacitor being radiated by a third X-ray, so that the third transistor outputting a corresponding third sensing current, the fourth voltage being changed because the fourth capacitor being radiated by a fourth X-ray, so that the fourth transistor outputting a corresponding fourth sensing current.

6. The circuit according to claim 5, wherein the first switch and the fourth switch being turned on, a compensation action of the first-row pixel circuit being finished, the third switch and the seventh switch being turned off, the second-row pixel circuit starting to conduct the compensation action, the third current flowing through the third transistor equaling to a current value of the second current source, the second current source making a third threshold voltage of the third transistor to be stored in the third capacitor, so that the third transistor conducting the compensation action, the fourth current flowing through the fourth transistor equaling to the current value of the third current source, the third current source making a fourth threshold voltage of the fourth transistor to be stored in the fourth capacitor, so that the fourth transistor conducting the compensation action.

7. The circuit according to claim 6, wherein the third switch and the seventh switch are turned on, a compensation action of a second-row pixel circuit is finished.

8. An active X-ray sensing method for providing an active X-ray sensing circuit for compensating and sensing the threshold voltage of transistor in one scan, the steps of the active X-ray sensing method comprises:

providing a first-row pixel circuit, including a first pixel circuit and a second pixel circuit, wherein the first pixel circuit and the second pixel circuit being connected between a first scan line and a second scan line;

providing a second-row pixel circuit, including a third pixel circuit and a fourth pixel circuit, wherein the third pixel circuit and the fourth pixel circuit being connected between a second scan line and a third scan line;

providing a first data line, the first data line being connected to a first current source and a first amplifier;

providing a second data line, the second data line being connected to a second current source and a second amplifier, the first pixel circuit and the third pixel circuit being connected between a first data line and a second data line;

providing a third data line, the third data line being connected to a second current source and a second amplifier; and providing a fourth data line, the fourth data line being connected to a third current source and a third amplifier, wherein the second pixel circuit and the fourth pixel circuit being connected between a third data line and a fourth data line;

wherein, the first-row pixel circuit, the second-row pixel circuit, the first data line, the second data line, the third data line and the fourth data line being set in the active X-ray sensing circuit, the first-row pixel circuit conducting the reading, when the reading being completed by the first-row pixel circuit, the second-row pixel circuit conducting the reading, the first pixel circuit and the second pixel circuit of the first-row pixel circuit compensating the threshold voltage separately.

9. The method according to claim 8, wherein the first pixel circuit comprises:

a first transistor, a first end of the first transistor being connected to a first scan line;

a first gate transistor, a third end of the first gate transistor being connected to a second end of the first transistor, a first end of the first gate transistor being connected to a first scan line, a second end of the first gate transistor being connected to a second scan line;

a first source transistor, a first end of the first source transistor being connected to a first data line, a second end of the first source transistor being connected to the first scan line, a third end of the first source transistor being connected to the source of the first transistor;

a first capacitance transistor, a first end of the first capacitance transistor being connected to the third end of the first gate transistor, the second end of the first capacitance transistor being connected to the first scan line;

a first capacitor, one end being connected to a third end of the first capacitance transistor, another end of the first capacitor being connected to a third end of the first transistor; and a first diode, the first diode being connected to the third end of the first capacitance transistor;

a second pixel circuit comprising:
  a second transistor, a first end of the second transistor being connected to the first scan line;
  a second gate transistor, a third end of the second gate transistor being connected to a second end of the second transistor, the first end of the second gate transistor being connected to the first scan line, the second end of the second gate transistor being connected to the second scan line;
  a second source transistor, a first end of the second source transistor being connected to the third data line, a second end of the second source transistor being connected to the first scan line, a third end of the second source transistor being connected to a third end of the second transistor;
  a second capacitance transistor, a first end of the second capacitance transistor being connected to a third end of the second gate transistor, a second end of the second capacitance transistor being connected to the first scan line;
  a second capacitor, one end being connected to a third end of the second capacitance transistor, another end of the second capacitor being connected to a third end of the second transistor; and
  a second diode, the second diode being connected to a third end of the second capacitance transistor;

a third pixel circuit comprising:
  a third transistor, a first end of the third transistor being connected to the second scan line;
  a third gate transistor, a third end of the third gate transistor being connected to a second end of the third transistor, a first end of the third gate transistor being connected to the second scan line, the second end of the third gate transistor being connected to the third scan line;
  a third source transistor, a first end of the third source transistor being connected to the second data line, a second end of the third source transistor being connected to the second scan line, a third end of the third source transistor being connected to a third end of the third transistor;
  a third capacitance transistor, a first end of the third capacitance transistor being connected to a third end of the third gate transistor, a second end of the third capacitance transistor being connected to the second scan line;
  a third capacitor, one end of the third capacitor being connected to a third end of the third capacitance transistor, another end of the third capacitor being connected to the third end of the third transistor; and a third diode, the third diode being connected to the third end of the third capacitance transistor; and a fourth pixel circuit comprising:
  a fourth transistor, a first end of the fourth transistor being connected to the second scan line;
  a fourth gate transistor, a third end of the fourth gate transistor being connected to a second end of the fourth transistor, a first end of the fourth gate transistor being connected to the second scan line, the second end of the fourth gate transistor being connected to the third scan line;
  a fourth source transistor, a first end of the fourth source transistor being connected to the fourth data line, a second end of the fourth source transistor being connected to the second scan line, a third end of the fourth source transistor being connected to a third end of the fourth transistor;
  a fourth capacitance transistor, a first end of the fourth capacitance transistor being connected to a third end of the fourth gate transistor, a second end of the fourth capacitance transistor being connected to the third scan line;
  a fourth capacitor, one end of the fourth capacitor being connected to the third end of the fourth capacitance transistor, another end of the fourth capacitor being connected to the third end of the fourth transistor; and
  a fourth diode, the fourth diode being connected to the third end of the fourth capacitance transistor.

10. The method according to claim 9, wherein the active X-ray sensing circuit further comprises a first current source a first amplifier a first amplifying capacitor a first switch and a second switch, a second current source, a second amplifier, a second amplifying capacitor, a third switch, a fourth switch, a fifth switch, a sixth switch, a seventh switch and an eighth switch, the first switch being connected between a first data line and a first current source, the second switch being connected between the first data line and the first amplifier, the first amplifier being connected to the first amplifying capacitor, the third switch is connected between the second data line and the second current source, the fifth switch being connected between the second data line and the second amplifier, the second amplifier being connected to the second amplifying capacitor, the fourth switch being connected between the third data line and the second current source, the sixth switch being connected between the third data line and the second amplifier, the second amplifier being connected to the second amplifying capacitor, the seventh switch being connected between the fourth data line and the third current source, the eighth switch being connected between the fourth data line and the third amplifier, the third amplifier being connected to the third amplifying capacitor.

11. The method according to claim 10, wherein the second switch and the sixth switch being turned off to control a first-row pixel circuit for reading, the first voltage being changed because the first capacitor being radiated by a first X-ray, so that a first transistor outputting a corresponding first sensing current, a second voltage being changed because the second capacitor being radiated by a second X-ray, so that the second transistor outputting a corresponding second sensing current.

12. The method according to claim 11, wherein the second switch and the sixth switch being turned on, and the first switch and the fourth switch being turned off, the first-row pixel circuit starting to conduct a compensation action, a first current flowing through the first transistor equaling to a current value of the first current source, the first current source making a first threshold voltage of the first transistor to be stored in the first capacitor, so that the first transistor conducting the compensation action, the second current flowing through the second transistor equaling to a current value of the second current source, the second current source making a second threshold voltage of the second transistor to be stored in the second capacitor, so that the second transistor conducting the compensation action, the fifth switch and the eighth switch being turned off, the second-row pixel circuit conducting the compensation action, the third voltage being changed because the third capacitor being radiated by a third X-ray, so that the third transistor outputting a corresponding third sensing current, the fourth voltage being changed because the fourth capacitor being radiated by a fourth X-ray, so that the fourth transistor outputting a corresponding fourth sensing current.

13. The method according to claim 12, wherein the first switch and the fourth switch being turned on, a compensation action of the first-row pixel circuit being finished, the third switch and the seventh switch being turned off, the second-row pixel circuit starting to conduct the compensation action, the third current flowing through the third transistor equaling to a current value of the second current source, the second current source making a third threshold voltage of the third transistor to be stored in the third capacitor, so that the third transistor conducting the compensation action, the fourth current flowing through the fourth transistor equaling to the current value of the third current source, the third current source making a fourth threshold voltage of the fourth transistor to be stored in the fourth capacitor, so that the fourth transistor conducting the compensation action.

14. The circuit according to claim 13, wherein the third switch and the seventh switch are turned on, a compensation action of a second-row pixel circuit is finished.

\* \* \* \* \*